(12) United States Patent
Kimura et al.

(10) Patent No.: US 8,978,812 B2
(45) Date of Patent: Mar. 17, 2015

(54) CONSTRUCTION MACHINE

(71) Applicant: Hitachi Construction Machinery, Co., Ltd., Tokyo (JP)

(72) Inventors: Shogo Kimura, Koka (JP); Hiroshi Tabeta, Konan (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/232,637

(22) PCT Filed: Oct. 3, 2012

(86) PCT No.: PCT/JP2012/075651
§ 371 (c)(1),
(2) Date: Jan. 14, 2014

(87) PCT Pub. No.: WO2013/051609
PCT Pub. Date: Apr. 11, 2013

(65) Prior Publication Data
US 2014/0161578 A1    Jun. 12, 2014

(30) Foreign Application Priority Data
Oct. 5, 2011 (JP) .................. 2011-220945

(51) Int. Cl.
*B60N 2/46* (2006.01)
*E02F 9/16* (2006.01)
(Continued)

(52) U.S. Cl.
CPC .................. *E02F 9/16* (2013.01); *E02F 9/2004* (2013.01); *B66C 13/54* (2013.01); *E02F 3/30* (2013.01); *E02F 3/325* (2013.01); *B60N 2/468* (2013.01)

USPC ... 180/326; 180/324; 180/89.13; 296/190.05; 414/687; 297/411.2

(58) Field of Classification Search
CPC ......... E02F 9/166; E02F 9/0891; E02F 3/325; B62D 33/0604; B62D 33/0617; B62D 33/067
USPC .......... 180/324, 326, 327, 89.13; 296/190.05; 297/411.2; 414/687
See application file for complete search history.

(56) References Cited

U.S. PATENT DOCUMENTS 7,347,299 B2 * 3/2008 Billger et al. .................. 180/326
7,389,845 B2 * 6/2008 Longueville et al. ......... 180/326
(Continued)

FOREIGN PATENT DOCUMENTS

| JP | 07-025292 A | 1/1995 |
|----|-------------|--------|
| JP | 2000-170209 A | 6/2000 |

(Continued)

*Primary Examiner* — Paul N Dickson
*Assistant Examiner* — Darlene P Condra
(74) *Attorney, Agent, or Firm* — Mattingly & Malur, PC

(57) ABSTRACT

An operator's seat mounting section (11) that is positioned in back side of a floor member (10) includes a seat plate (11D) for mounting an operator's seat (14) and an equipment mounting part (11F) that rises upward from the right side of the seat plate (11D), and a right operating lever assembly (16) is provided in front of the equipment mounting part (11F). A controller accommodating space (21) is provided to be positioned in back side of a console (16A) of the right operating lever assembly (16) and between a side surface (11F1) of the equipment mounting part (11F) of the operator's seat mounting section (11) and the operator's seat (14), and a controller (27) is mounted in the controller accommodating space (21) to control various kinds of electric equipment.

4 Claims, 13 Drawing Sheets

(51) Int. Cl.
*E02F 9/20* (2006.01)
*B66C 13/54* (2006.01)
*E02F 3/30* (2006.01)
*E02F 3/32* (2006.01)

(56) References Cited

U.S. PATENT DOCUMENTS 8,104,566 B2 * 1/2012 Harber et al. ............... 180/315
2006/0266573 A1 11/2006 Ishii et al.
2007/0145805 A1 * 6/2007 Bower ..................... 297/411.21
2009/0230749 A1 * 9/2009 Kostak et al. ............ 297/411.36
2010/0006364 A1 * 1/2010 Koutsky et al. ............... 180/329

FOREIGN PATENT DOCUMENTS

| JP | 2001-98953 A | 4/2001 |
| JP | 2005-119545 A | 5/2005 |
| JP | 2006-077544 A | 3/2006 |

* cited by examiner

CONSTRUCTION MACHINE

TECHNICAL FIELD

The present invention relates to a construction machine that is equipped with, for example, a controller for controlling electric equipment, such as a construction machine of a hydraulic excavator, a hydraulic crane or the like.

BACKGROUND ART

In general, a hydraulic excavator as a typical example of a construction machine comprises an automotive lower traveling structure, an upper revolving structure that is mounted on the lower traveling structure to be able to revolve thereon, and a working mechanism that is mounted at a front side of the upper revolving structure to be able to tilt thereto.

The upper revolving structure is provided with a revolving frame that forms a support structure, a floor member that is provided on the revolving frame and constitutes an operator's seat mounting section at the rear side and a foot rest section at the front side on which an operator rests its feet, an operator's seat that is mounted to the operator's seat mounting section of the floor member and on which an operator is seated, and right and left operating lever assemblies that are provided at both of the right and left sides of the operator's seat for operating the working mechanism.

An engine and various kinds of electric equipment such as illuminations, monitors, sensors and the like are mounted on the hydraulic excavator, and also a controller that controls these components is mounted thereon. As an arrangement location of the controller, there is known the construction where the controller is arranged on a support base in back of the operator's seat inside a cab box forming an operator's room (for example, see, Patent Document 1).

PRIOR ART DOCUMENT

Patent Document

Patent Document 1: Japanese Patent Laid-Open No. 2000-170209 A

SUMMARY OF THE INVENTION

In the hydraulic excavator disclosed in Patent Document 1 as mentioned above, a space section is provided at the rear side in the cab box, and the controller is arranged on the support base that is arranged on this space section.

Here, there is a small-sized hydraulic excavator that is called a mini-excavator as the hydraulic excavator. In the small-sized hydraulic excavator, for being able to perform a work thereof even at a narrow working site such as a residence area or an off street, the lower traveling structure is constituted such that each width dimension in the front-rear direction and in the right-left direction becomes a small value. On the other hand, the upper revolving structure is formed in a small size such that a revolving radius of the rear end section at revolving does not protrude largely from the lower traveling structure having a narrow width. The hydraulic excavator of this form is so-called an excavator of a rear small-revolving type, a cab box of which is also formed to be small-sized, and various kinds of equipment, components, the controller and the like are narrowly arranged in the narrow space in the cab box.

Therefore, in the small-sized hydraulic excavator, it is difficult to secure the space for disposing the controller in the cab box, and the controller is forcedly arranged in the narrow space. As a result, there is a problem that a removal work, an inspection work, a repair work and the like of the controller cannot be performed easily.

In view of the above-discussed problems with the conventional art, it is an object of the present invention to provide a construction machine in which a controller can be arranged in a position within easy reach also to an upper revolving structure in a small size to easily perform an inspection work and a repair work of the controller.

(1) A construction machine according to the present invention comprises: an automotive lower traveling structure; an upper revolving structure that is mounted on the lower traveling structure to be able to revolve thereon; and a working mechanism that is tiltably mounted to the upper revolving structure, wherein the upper revolving structure includes: a revolving frame that forms a support structure; and a floor member that is provided on the revolving frame and constitutes an operator's seat mounting section at the rear side and a foot rest section at the front side on which an operator rests his or her feet, the operator's seat mounting section of the floor member includes a seat plate for mounting an operator's seat on which an operator is seated and an equipment mounting part that rises upward from one side of the seat plate in the right-left direction, and an operating lever assembly that is operated by the operator seated on the operator's seat is provided in front of the equipment mounting part.

In order to solve the above-mentioned problems, the constitution adopted by the present invention is characterized in that a controller accommodating space is provided in back side of the operating lever assembly and between a side surface of the equipment mounting part and the operator's seat, and a controller is mounted in the controller accommodating space to control various kinds of electric equipment.

With this arrangement, as in the case of the small-sized construction machine, even in a case where the upper revolving structure is sized to be small and therefore the space for mounting the controller is limited, it is possible to mount the controller in the controller accommodating space by using the controller accommodating space that is provided between the side surface of the equipment mounting part and the operator's seat in back side of the operating lever assembly. In addition, the controller accommodating space is in a position within easy arm's reach in a state where an operator is on the foot rest section of the floor member. As a result, even in the floor member in which various kinds of equipment and the components are narrowly arranged, it is possible to easily perform the removal work, the inspection work, the repair work and the like of the controller.

(2) According to this invention, a bracket member is provided to the side surface of the equipment mounting part to be positioned in the controller accommodating space, and the controller is mounted to the bracket member.

With this arrangement, the controller can be mounted by using the bracket member that is provided on the side surface of the equipment mounting part. In this case, since the controller can be mounted in a position away to the upward side from the seat plate, even if rainwater remains on the seat plate, it is possible to prevent the rainwater from entering into the controller.

(3) According to this invention, the bracket member includes a U-shaped space in a transverse section, and a part of the controller accommodating space is formed by the space having the U-shaped configuration. Therefore, the controller can easily be mounted to and removed from the controller accommodating space having the U-letter configuration in a transverse section, from above.

(4) According to this invention, a bracket member is provided in back side of the operating lever assembly and to the side surface of the equipment mounting part for mounting the controller and an arm rest on which an operator's arm rests, wherein the bracket member comprises: a fixing side vertical plate that extends in an upper-lower direction along the side surface of the equipment mounting part and is mounted to the side surface, a lower lateral plate that extends inside toward the operator's seat from a lower part of the fixing side vertical plate and an arm rest mounting vertical plate that is provided to extend in an upper direction from a tip end part of the lower lateral plate to oppose the fixing side vertical plate with an interval and to which the arm rest is mounted, and a part of the controller accommodating space is a U-shaped space in a transverse section, which is formed with the fixing side vertical plate, the lower lateral plate and the arm rest mounting vertical plate that constitute the bracket member.

With this arrangement, the U-shaped space formed by the fixing side vertical plate, the lower lateral plate, and the arm rest mounting vertical plate that constitute the bracket member is used as a part of the controller accommodating space, making it possible to accommodate the controller in this space. Further, the arm rest can be mounted to the arm rest mounting vertical plate while keeping away from the controller.

(5) According to this invention, a controller fixing member is provided to the fixing side vertical plate of the bracket member for fixing the controller, wherein the controller is fixed in a vertical arrangement state of extending in an upper-lower direction and in a front-rear direction to the controller fixing member. By thus fixing the controller in the vertical arrangement state by using the controller fixing member, the controller can be installed also in a narrow place.

(6) According to this invention, the controller fixing member comprises a flat plate that extends in a front-rear direction along the side surface of the equipment mounting part and a pair of controller mounting frames that are provided respectively in a front side position and in a rear side position of the flat plate, wherein the controller is provided with mounting projections in a front side position and in a rear side position of a case for accommodating an electric component, and the controller is constituted such that each of the mounting projections is fixed to each of the controller mounting frames by using bolts.

With this arrangement, the bolt is used to fasten the mounting projection provided in the case of the controller to the controller mounting frame of the controller fixing member, thereby making it possible to mount the controller to the controller fixing member integrally.

(7) According to this invention, a cover member for covering the controller is provided, and the cover member is supported by the bracket member and/or the controller fixing member. Therefore, the cover member can cover the controller between the cover member and the controller fixing member to protect the controller from earth and sand, dust, rainwater, impact and the like.

MODE FOR CARRYING OUT THE INVENTION

Hereinafter, a construction machine according to an embodiment in the present invention will be in detail explained with reference to FIG. 1 to FIG. 15, by taking a small-sized hydraulic excavator as an example thereof.

Figure 1:
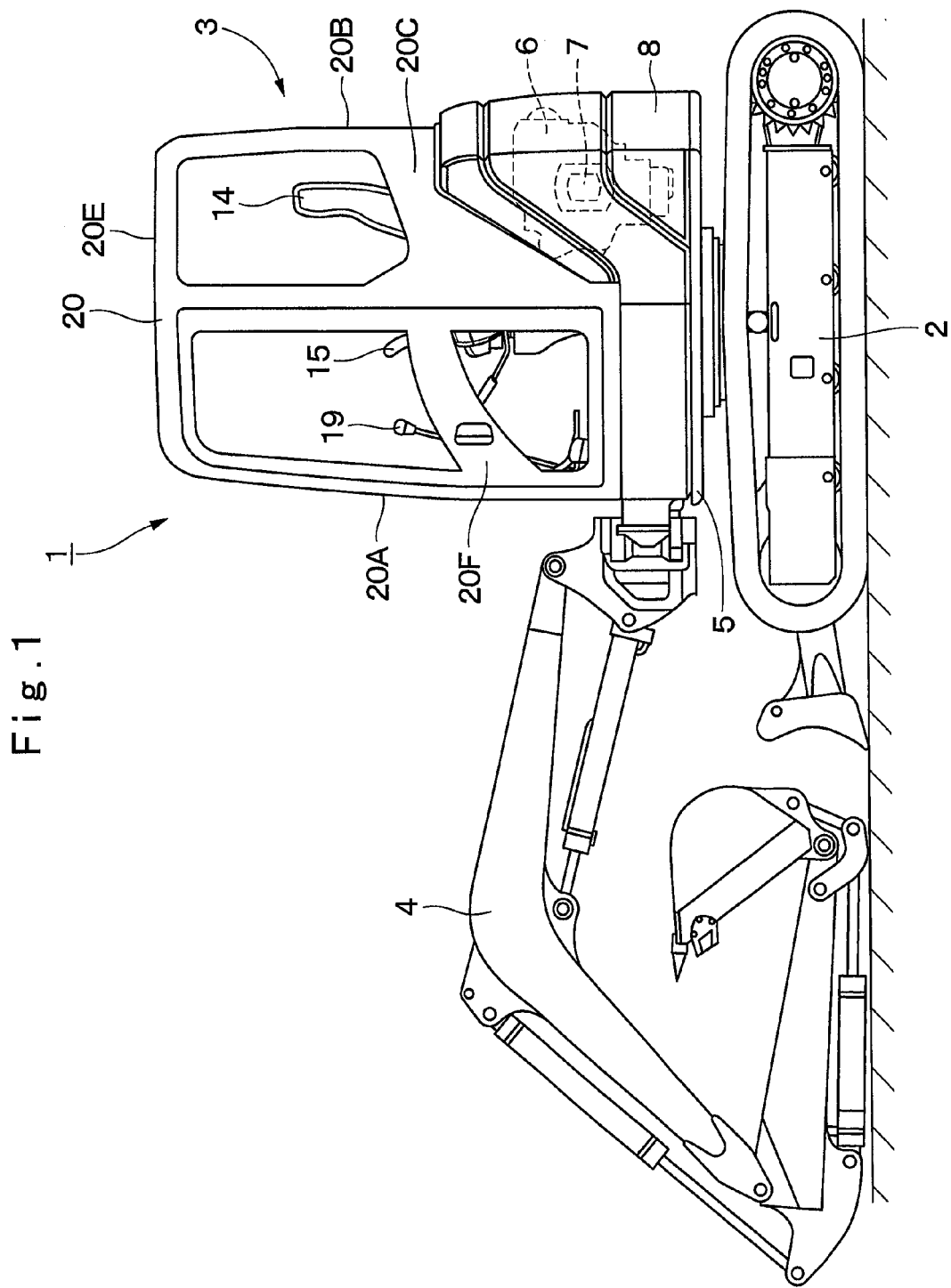
FIG. 1 is a front view showing a hydraulic excavator that is applied to an embodiment of the present invention.

In FIG. 1, designated at 1 is a hydraulic excavator of a crawler type as a construction machine. The hydraulic excavator 1 is a small-sized hydraulic excavator that is called a mini-excavator suitable for an operation at a narrow working site. The hydraulic excavator 1 comprises an automotive lower traveling structure 2, an upper revolving structure 3 that is mounted on the lower traveling structure 2 to be capable of revolving thereon, and a working mechanism 4 that is provided in front of the upper revolving structure 3 for performing an excavating operation of earth and sand, or the like.

Herein, the upper revolving structure 3 has a width dimension in a right-left direction generally equal to a vehicle width of the lower traveling structure 2, is sized to be as small as to be accommodated within a revolving radius at the time the upper revolving structure 3 revolves, and is formed in a generally circular shape as viewed from above. In consequence, the hydraulic excavator 1 is constituted as a rear small-revolving type of hydraulic excavator in which, when the upper revolving structure 3 revolves on the lower traveling structure 2, a rear surface of a counterweight 8 to be described later is accommodated substantially in the vehicle width of the lower traveling structure 2. It should be noted that the above revolving radius is defined by a distance from the revolving center of the upper revolving structure 3 to the rear surface of the counterweight 8.

Figure 2:
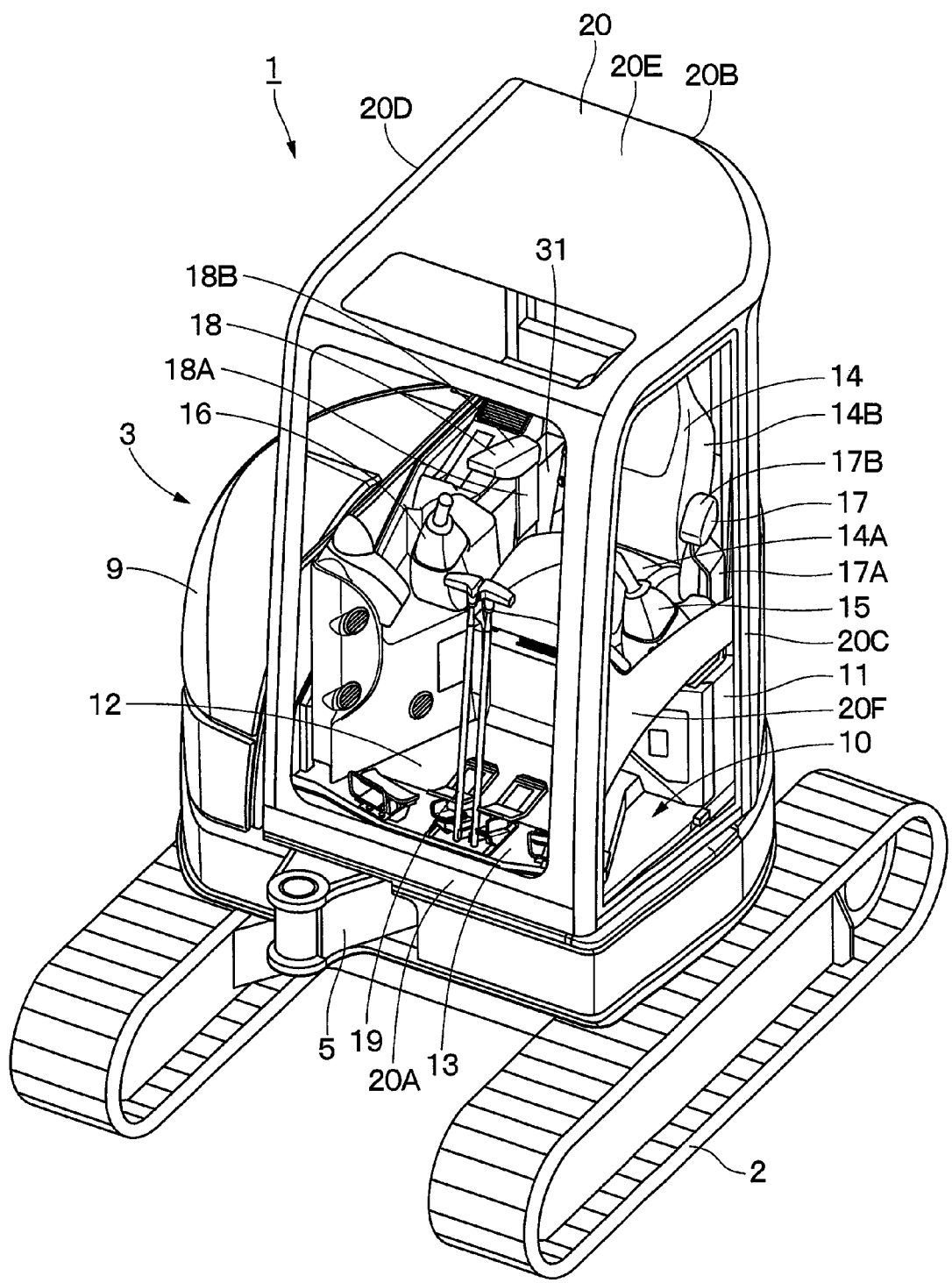
FIG. 2 is a perspective view showing the hydraulic excavator in a state where a working mechanism is removed.
Figure 3:
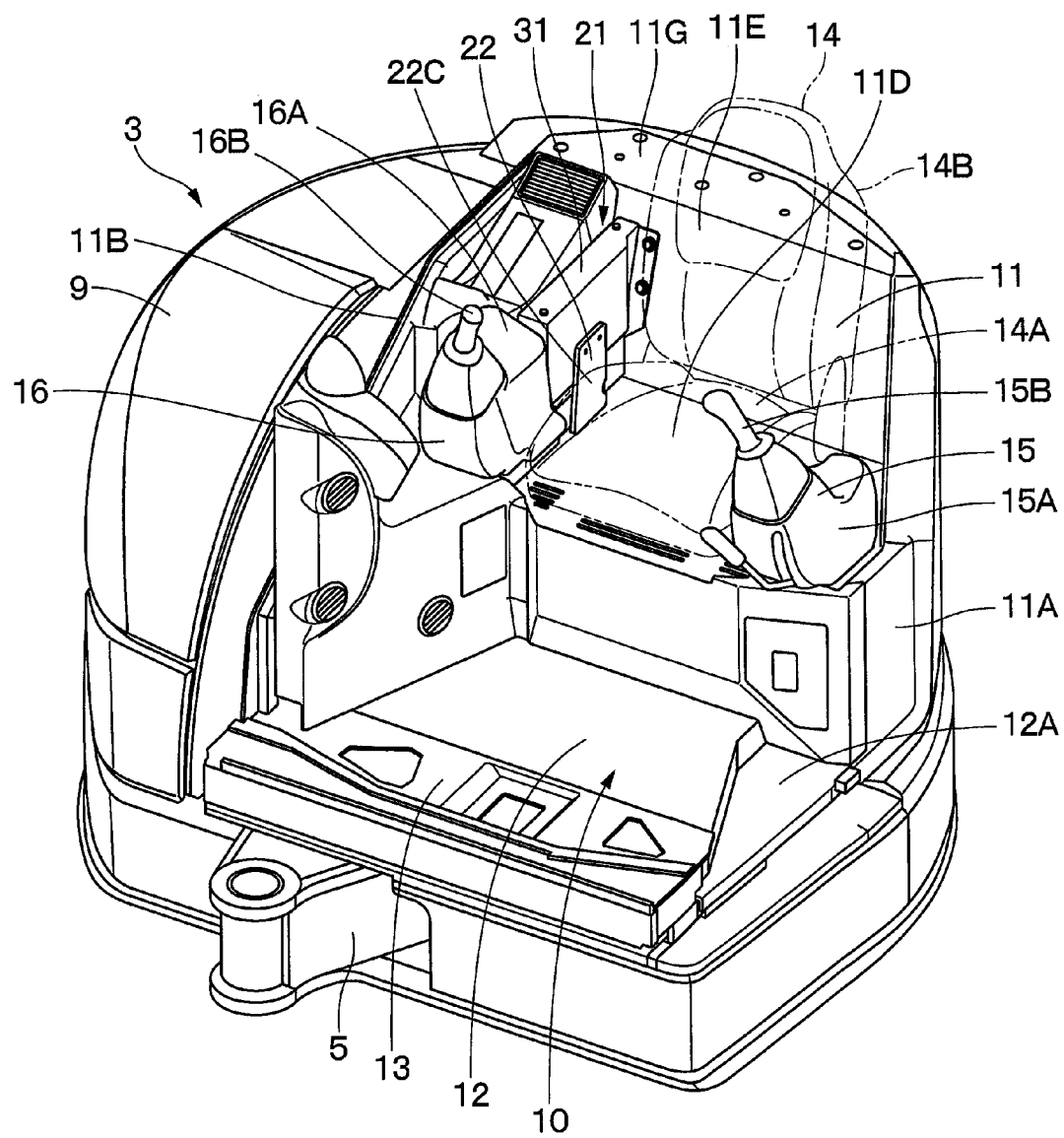
FIG. 3 is a perspective view showing an upper revolving structure in a state where a cab box and the like are removed.

As shown in FIG. 1 to FIG. 3, the upper revolving structure 3 is provided with a revolving frame 5 that forms a support structure, and an engine 6, a floor member 10, an operator's seat 14, a left operating lever assembly 15, a right operating lever assembly 16, a left arm rest 17, a right armrest 18, a controller accommodating space 21, a bracket member 22, a controller 27, and the like which are disposed on the revolving frame 5 and will be described later. The working mechanism 4 is mounted to the front side of the revolving frame 5 to be capable of swinging and tilting thereto. Further, two tilting support members (not shown) are provided in the left front part of the revolving frame 5 to have an interval in the right-left direction therebetween. A lever/pedal mounting section 13 of the floor member 10 to be described later is connected to each of the tilting support members to be capable of tilting (tilt up or tilt down).

The engine 6 is mounted on the rear side in the revolving frame 5, and the engine 6 drives and rotates a hydraulic pump 7 (respectively shown in a dotted line of FIG. 1). The counterweight 8 is provided in the rear part of the revolving frame 5, and the counterweight 8 acts as a weight balance to the working mechanism 4, and is formed to be bent in an arc shape in such a manner as to cover a rear side of the engine 6. Further, an exterior cover 9 is disposed on the revolving frame 5 to be positioned in the periphery of a cab box 20 (floor member 10) to be described later, and the exterior cover 9 covers the onboard equipment including the engine 6.

Next, an explanation will be made of the floor member 10 that is provided in front of the engine 6 among the revolving frame 5.

Designated at 10 is the floor member that is disposed in a position closer to the left side on the revolving frame 5. The floor member 10 has a front side position that is supported in the front side position of the revolving frame 5 through the tilting support member to be capable of tilting. Therefore, the floor member 10 can tilt up/down together with the operator's seat 14, the cab box 20, which will be described later, and the like by using the front side position as a fulcrum. The floor member 10 is provided with an operator's seat mounting section 11, a foot rest section 12, the lever/pedal mounting section 13, and the like which will be described later.

Figure 4:
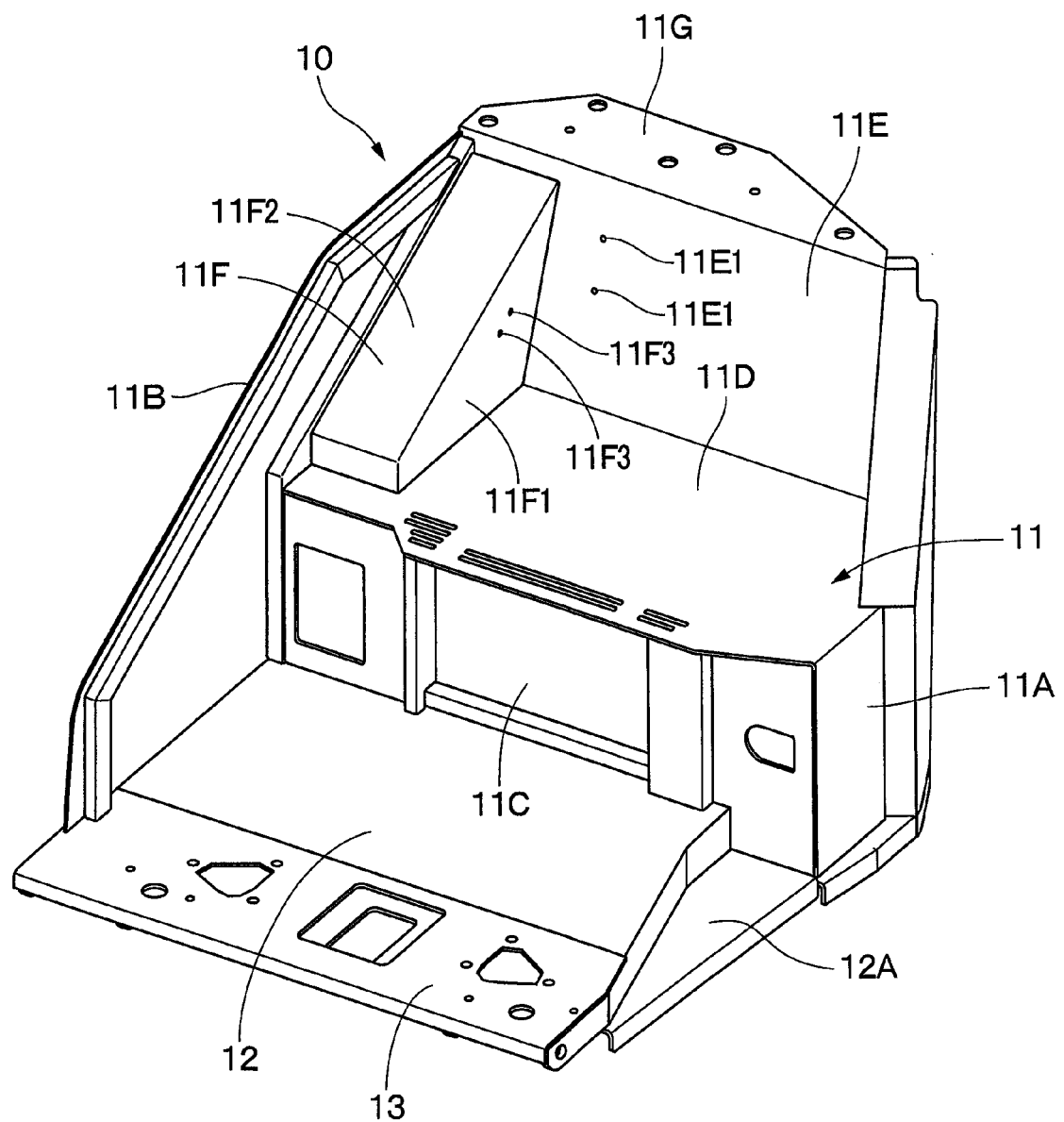
FIG. 4 is a perspective view shown by enlarging a floor member as a single unit.

The operator's seat mounting section 11 is positioned at the back side of the floor member 10, and, as shown in a two-dot chain line in FIG. 3, the operator's seat mounting section 11 is provided with the operator's seat 14, which will be described later, mounted at the upper side. As shown in FIG. 4, the operator's seat mounting section 11 comprises a left side plate 11A that is installed upright in such a manner as to extend in the front-rear direction to be positioned at the left side in the right-left direction, a right side plate 11B that is installed upright in such a manner as to extend in the front-rear direction to be positioned at the right side, a laterally long front plate 11C that is installed upright from the back side of the foot rest section 12 and to close between the left side plate 11A and the right side plate 11B, a seat plate 11D that is provided to extend in the horizontal direction between the respective side plates 11A and 11B at a top part position of the front plate 11C and to which the operator's seat 14 is mounted, a back plate 11E that is inclined to a rear side from the back part of the seat plate 11D and extends upward, an equipment mounting part 11F in a triangle frame shape that rises above along the right side plate 11B from the right side of the seat plate 11D, and a mounting plate 11G that is provided to extend to the rear side from the top part of the back plate 11E and is mounted to the top part of the counterweight 8 at tilting-down.

For example, two screw holes 11E1 are provided in the back plate 11E to be positioned in back of the bracket member 22 to be described later. Bolts 26 are screwed into the two screw holes 11E1 for mounting the rear side of the controller fixing member 24 to be described later.

Herein, the equipment mounting part 11F comprises a side surface 11F1 that is formed in a front descending triangle frame shape and rises from the seat plate 11D in a position spaced apart to the left side from the right side plate 11B, and a rectangular mounting surface 11F2 that is provided to be inclined along an inclination end edge of the side surface 11F1. The side surface 11F1 is provided with, for example, two screw holes 11F3 to be positioned closer to the top side at an intermediate position in the front-rear direction. Bolts 23 are screwed into the two screw holes 11F3 for mounting the bracket member 22 to be described later. In this case, the side surface 11F1 constitutes a wall surface for closing the right side of the controller accommodating space 21 to be described later. Further, operating switches of a radio, an air conditioner, and the like (none of them are shown) are mounted on the mounting surface 11F2.

The foot rest section 12 is used for an operator seated on the operator's seat 14 to rest his or her feet on, and is provided in front of the operator's seat mounting section 11. The foot rest section 12 is formed as a flat plate in a rectangular shape elongated in the right-left direction. On the other hand, a left end of the foot rest section 12 that is positioned at the side of a door 20F of the cab box 20 to be described later is used as a foot step part 12A. The foot step part 12A is lower by one step than the foot rest section 12 in such a manner that an operator can step his or her feet thereon at the time of getting on/off the floor member 10.

The lever/pedal mounting section 13 is provided in front of the foot rest section 12, and the lever/pedal mounting section 13 extends in the right-left direction along the front end of the foot rest section 12. The lever/pedal mounting section 13 is provided with an operating lever/pedal 19 and the like for traveling which will be described later.

The operator's seat 14 is provided on the floor member 10 (see, FIG. 2 and FIG. 3), and the operator's seat 14 is mounted in the central position of the seat plate 11D that constitutes the operator's seat mounting section 11. The operator's seat 14 is used for an operator to be seated on at the time of operating the hydraulic excavator 1. Herein, the operator's seat 14 comprises a seat part 14A that is mounted on the seat plate 11D and on which an operator is seated, and a back rest part 14B that is installed upright from the rear portion of the seat part 14A and on which an operator rests the upper body.

Figure 6:
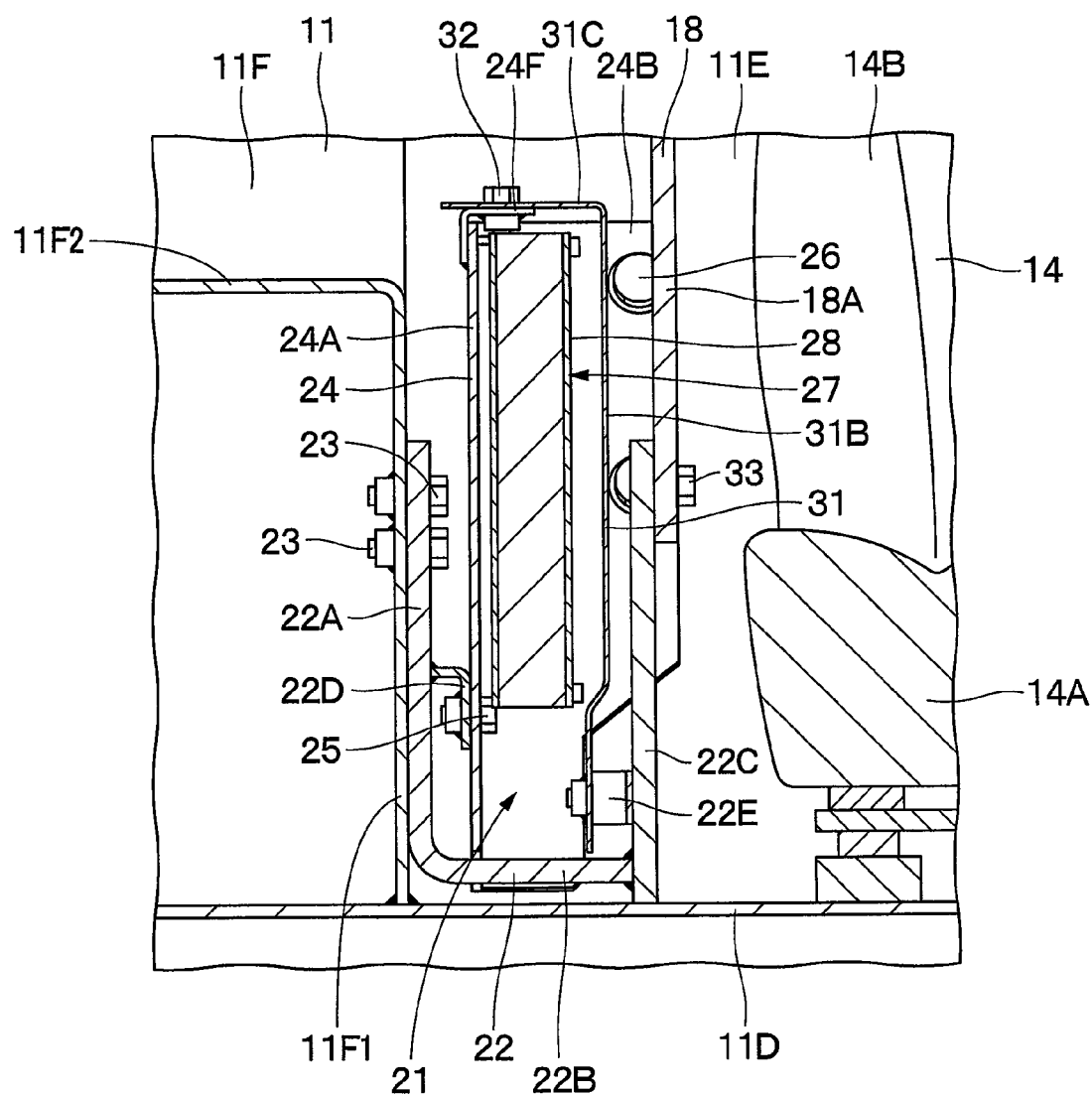
FIG. 6 is an enlarged cross section showing an accommodating state of a controller as viewed in a direction of arrows VI-VI in FIG. 5.

The operator's seat 14 is mounted in the central position of the seat plate 11D in the right-left direction as described above. In consequence, as shown in FIG. 6, the seat part 14A can be arranged in a position away in the left side from the side surface 11F1 of the equipment mounting part 11F. Accordingly, the controller accommodating space 21 to be described later can be formed between the right end of the seat part 14A and the side surface 11F1 of the equipment mounting part 11F.

The left operating lever assembly 15 is disposed in the left side of the operator's seat 14, and comprises a console 15A that is formed in a box shape, and a lever portion 15B that is positioned in front of the console 15A and extends upward to be capable of tilting. This lever portion 15B is connected to a pilot valve (not shown) of a pressure reducing valve type that is provided in the console 15A.

On the other hand, the right operating lever assembly 16 is disposed in the right side of the operator's seat 14, and comprises a console 16A that is formed in a box shape as substantially similar to the left operating lever assembly 15, and a lever portion 16B that is positioned in front of the console 16A and extends upward to be capable of tilting. This lever portion 16B is connected to a pilot valve (not shown) of a pressure reducing valve type that is provided in the console 16A. Herein, the right operating lever assembly 16 is arranged in a position in front of the controller 27 to be described later between the equipment mounting part 11F of the operator's seat mounting section 11 and the operator's seat 14. Thereby, the console 16A of the right operating lever assembly 16 closes the front side of the controller accommodating space 21 to be described later.

As shown in FIG. 2, the left arm rest 17 is provided in back of the left operating lever assembly 15, on which a left arm of an operator operating the lever portion 15B rests, and acts to make the arm stable for performing an accurate lever operation. The left arm rest 17 comprises a support plate 17A that extends upside from the seat plate 11D of the operator's seat mounting section 11 constituting the floor member 10 or the console 15A of the left operating lever assembly 15, and an arm rest part 17B that is provided on a top part of the support plate 17A and on which the operator's arm can rest.

Figure 5:
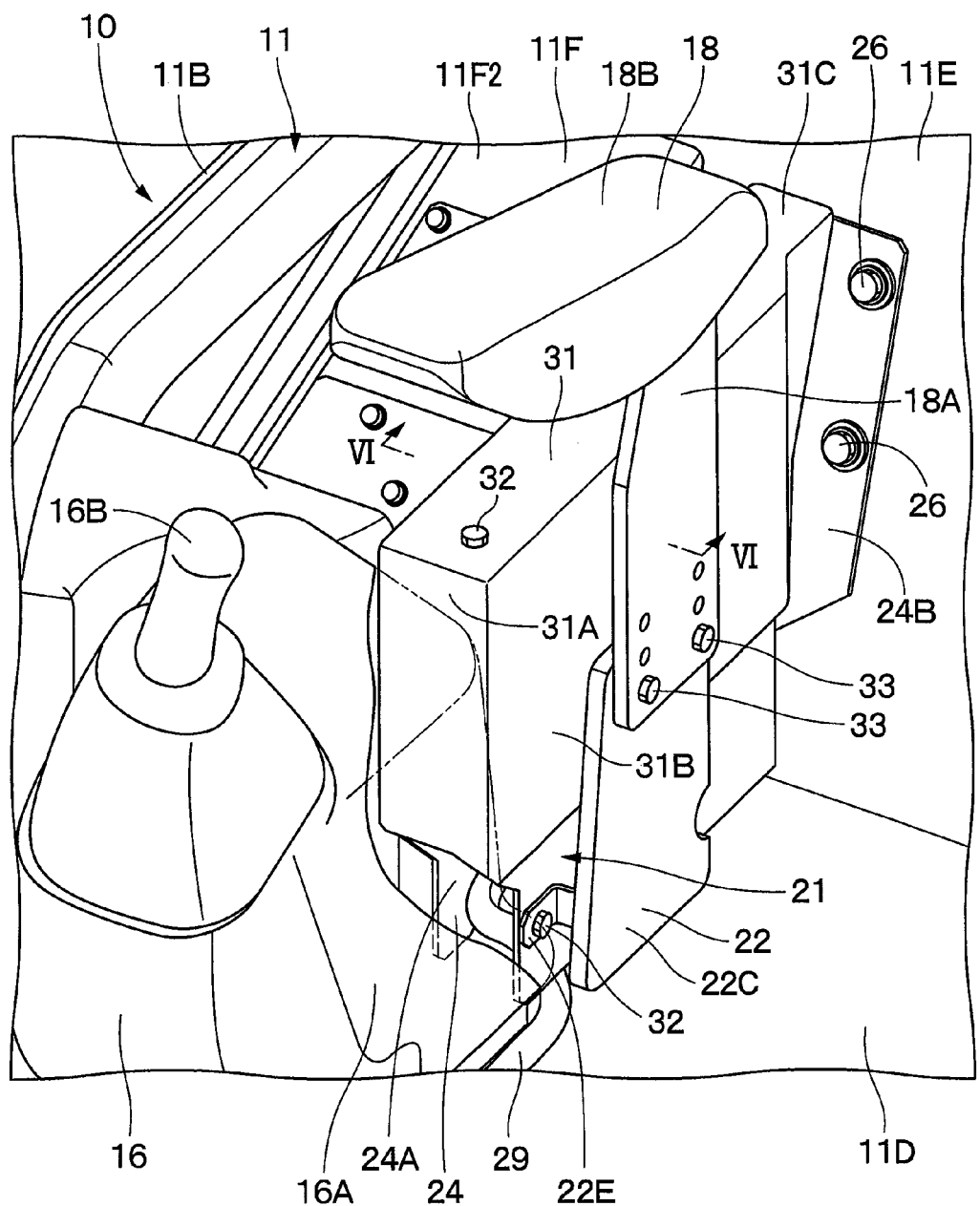
FIG. 5 is a partially enlarged perspective view of partial cutaway showing a state of mounting a right operating lever assembly, an arm rest, a cover member and the like to a right section of the floor member.

On the other hand, the right arm rest 18 is provided in back side of the right operating lever assembly 16, and the right arm rest 18, as substantially similar to the left arm rest 17 described above, comprises a support plate 18A and an arm rest part 18B. As shown in FIG. 5, the support plate 18A is mounted to the bracket member 22 to be described later.

The traveling operating lever/pedal 19 is provided in the lever/pedal mounting section 13 forward of the operator's seat 14. The traveling operating lever/pedal 19 is performed by a manual operation or a foot operation of an operator at the time of traveling the lower traveling structure 2.

The cab box 20 is provided on the floor member 10, and the cab box 20 covers the periphery of and the section above the floor member 10. The cab box 20 is formed in a boxy shape by a front surface 20A, a rear surface 20B, a left side surface 20C, a right side surface 20D and a top surface 20E, and a lower end portion thereof is mounted to a peripheral edge of the floor member 10. Thereby, the cab box 20 forms an operator's room, which is an occupancy space of the operator, on the floor member 10. The door 20F is rotatably provided in the left side surface 20C of the cab box 20 to open/close the entrance.

Next, an explanation will be made of the bracket member 22, the controller fixing member 24, the controller 27 and the cover member 31, which are accommodated in the controller accommodating space 21.

Designated at 21 is the controller accommodating space that is provided at the right side of the operator's seat 14. As shown in FIG. 3 and FIG. 6, the controller accommodating space 21 is a space above the seat plate 11D, and is formed between the side surface 11F1 of the equipment mounting part 11F in the operator's seat mounting section 11 and the operator's seat 14 in back side of the right operating lever assembly 16. Specifically, the controller accommodating space 21 is positioned above the seat plate 11D, and is formed as a space surrounded by the rear surface of the console 16A in the right operating lever assembly 16, the back plate 11E of the operator's seat mounting section 11, the side surface 11F1 of the equipment mounting part 11F, and the operator's seat 14. Further, as described in more detail, a part of the controller accommodating space 21 includes a U-shaped space in a transverse section, which is formed by a fixing side vertical plate 22A, a lower lateral plate 22B and an arm rest mounting vertical plate 22C of the bracket member 22 to be described later. Consequently, the controller accommodating space 21 is the space interposed between the side surface 11F1 of the equipment mounting part 11F and the operator's seat 14, including the U-shaped space of the bracket member 22.

The controller accommodating space 21 is a space for accommodating the controller 27, and forms a flat space that is longer in the front-rear direction and in the upper-lower direction and shorter in the right-left direction. This controller accommodating space 21 is a place within easy arm reach in a state where an operator rests on the foot rest section 12.

Designated at 22 is the bracket member that is provided in back side of the right operating lever assembly 16 and in the side surface 11F1 of the equipment mounting part 11F. The bracket member 22 is a mounting base for mounting the right arm rest 18, and forms a part of the space 21 for accommodating the controller 27. As shown in FIG. 6, FIG. 8, FIG. 9 and FIG. 12, the bracket member 22 comprises the fixing side vertical plate 22A that extends in an upper-lower direction along the side surface 11F1 of the equipment mounting part 11F and is mounted to the side surface 11F1, the lower lateral plate 22B that extends inside (left side) toward the operator's seat 14 from a lower part of the fixing side vertical plate 22A, and an arm rest mounting vertical plate 22C that is provided to extend in an upper direction from a tip end part of the lower lateral plate 22B to oppose the fixing side vertical plate 22A to have an interval in the right-left direction therebetween.

In this case, the bracket member 22 includes a U-shaped space in a transverse section, which is formed by the fixing side vertical plate 22A, the lower lateral plate 22B and the arm rest mounting vertical plate 22C to be opened to the upper side. The controller accommodating space 21 is formed to include this U-shaped space.

Figure 7:
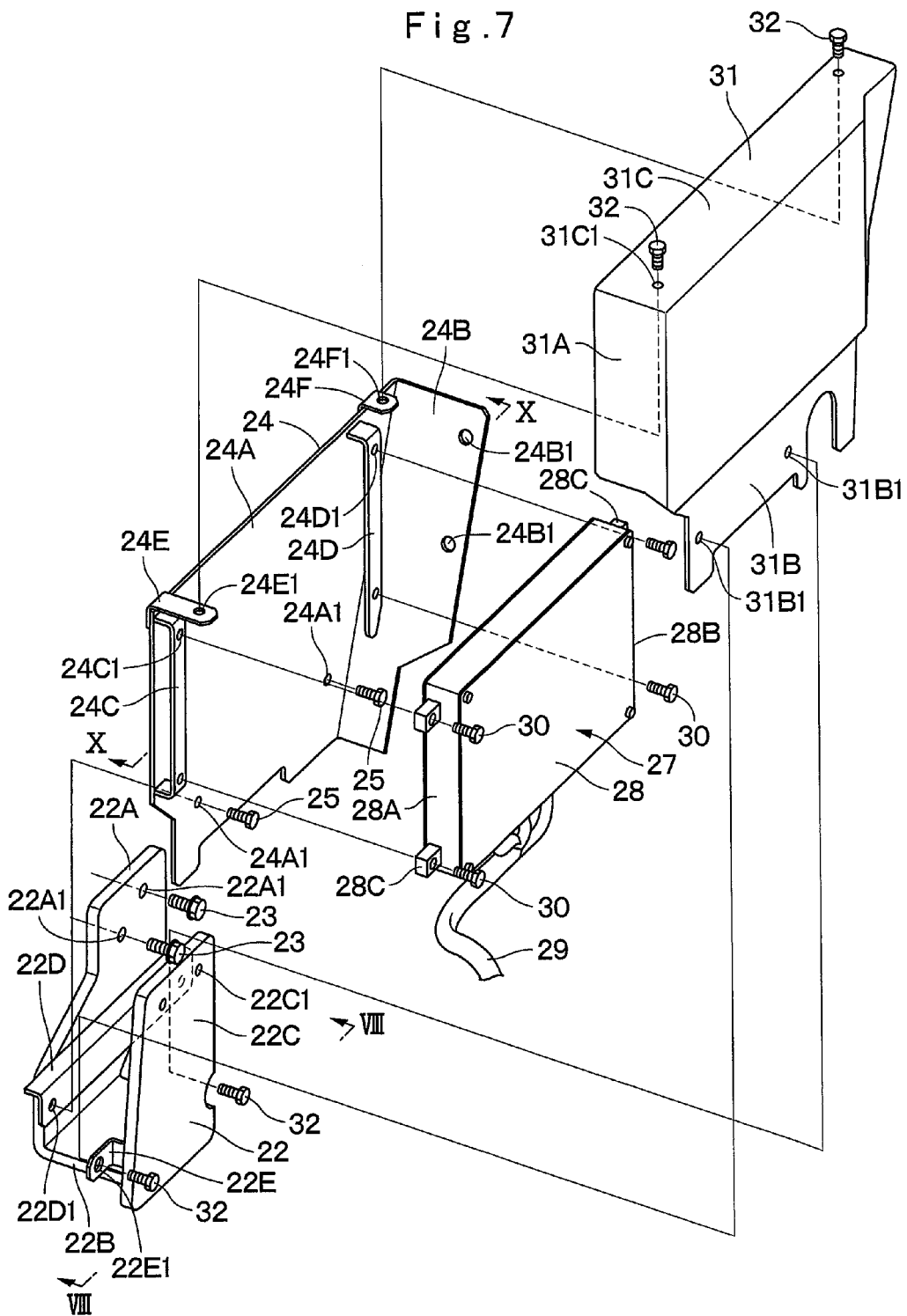
FIG. 7 is an exploded perspective view showing a state where a bracket member, a controller fixing member, the controller and the cover member are exploded.
Figure 8:
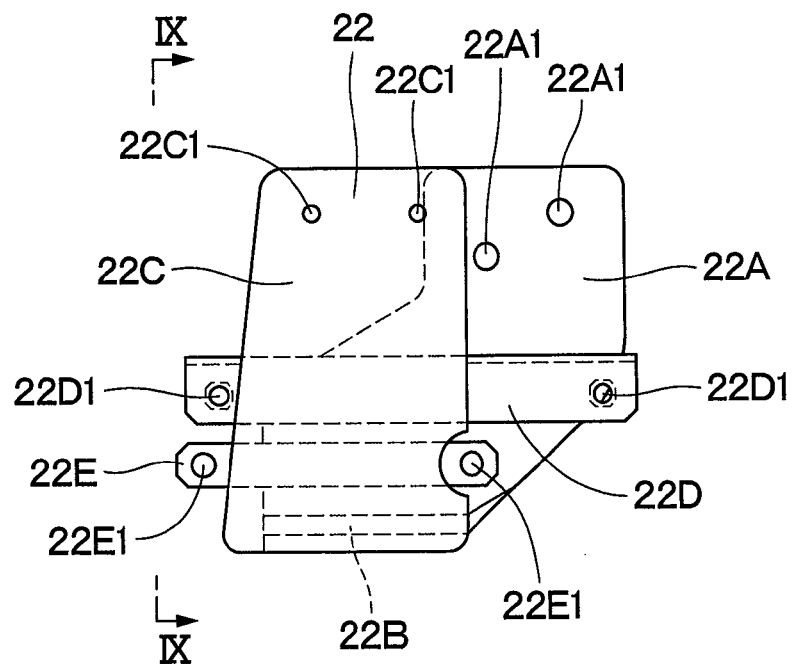
FIG. 8 is a front view showing the bracket member as viewed in a direction of arrows VIII-VIII in FIG. 7.
Figure 9:
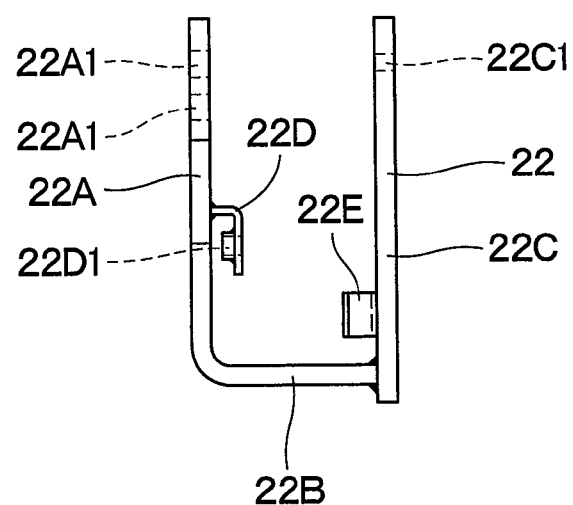
FIG. 9 is a left side view showing the bracket member as viewed in a direction of arrows IX-IX in FIG. 8.

Two bolt through holes 22A1 are provided at an upper part of the fixing side vertical plate 22A. Bolts 23 are inserted in the bolt through holes 22A1, and the bolts 23 are screwed into the screw holes 11F3 of the side surface 11F1, thus making it possible to mount the fixing side vertical plate 22A to the equipment mounting part 11F. On the other hand, a fixing member mounting frame 22D is mounted to an inner peripheral side of the fixing side vertical plate 22A opposing the arm rest mounting vertical plate 22C to extend in the horizontal direction (front-rear direction). Screw holes 22D1 are provided at both ends of the fixing member mounting frame 22D. As shown in FIG. 7, bolts 25 for mounting the controller fixing member 24 are screwed into the screw holes 22D1.

Two screw holes 22C1 are disposed in an upper part of the arm rest mounting vertical plate 22C, and bolts 33 are screwed into the screw holes 22C1 for mounting the support plate 18A of the right arm rest 18. On the other hand, cover member mounting projections 22E extending in the horizontal direction are mounted in a lower part of the arm rest mounting vertical plate 22C, and bolt through holes 22E1 are disposed at both ends of the cover member mounting projections 22E. As shown in FIG. 7, bolts 32 are inserted into the blot through holes 22E1 for mounting the cover member 31.

Designated at 24 is the controller fixing member that is disposed on the fixing side vertical plate 22A of the bracket member 22 (see, FIG. 10, FIG. 11, and FIG. 13), and the controller fixing member 24 fixes the controller 27. The controller fixing member 24 comprises a flat plate 24A in a substantially rectangular shape extending in the front-rear direction along the side surface 11F1 of the equipment mounting part 11F, an inclined plate 24B that extends to be bent toward a side of the operator's seat 14 from a rear end of the flat plate 24A and inclined to oppose the back plate 11E, a front-side controller mounting frame 24C that is disposed to extend in the upper-lower direction in a front position of the flat plate 24A, a rear side controller mounting frame 24D that is disposed to extend in the upper-lower direction in a rear position of the flat plate 24A, and two cover upper part mounting projections 24E and 24F that are disposed in positions in accordance with the controller mounting frames 24C and 24D respectively to protrude in a side of the operator's seat 14 in the front and rear positions of the upper part of the flat plate 24A.

Figure 10:
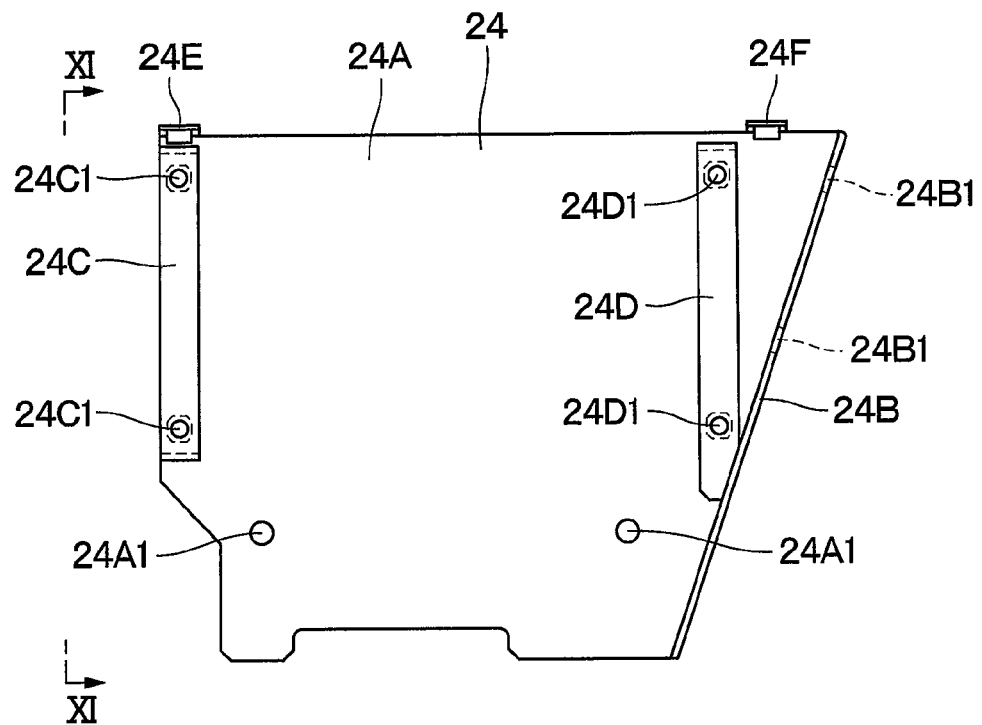
FIG. 10 is a front view showing the controller fixing member as viewed in a direction of arrows X-X in FIG. 7.
Figure 11:
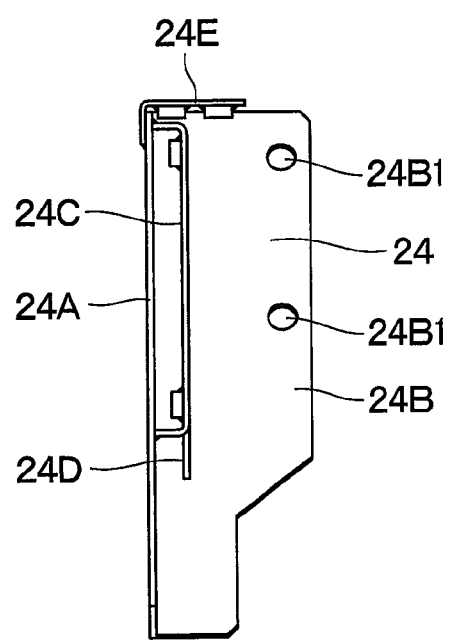
FIG. 11 is a left side view showing the controller fixing member as viewed in a direction of arrows XI-XI in FIG. 10.
Figure 13:
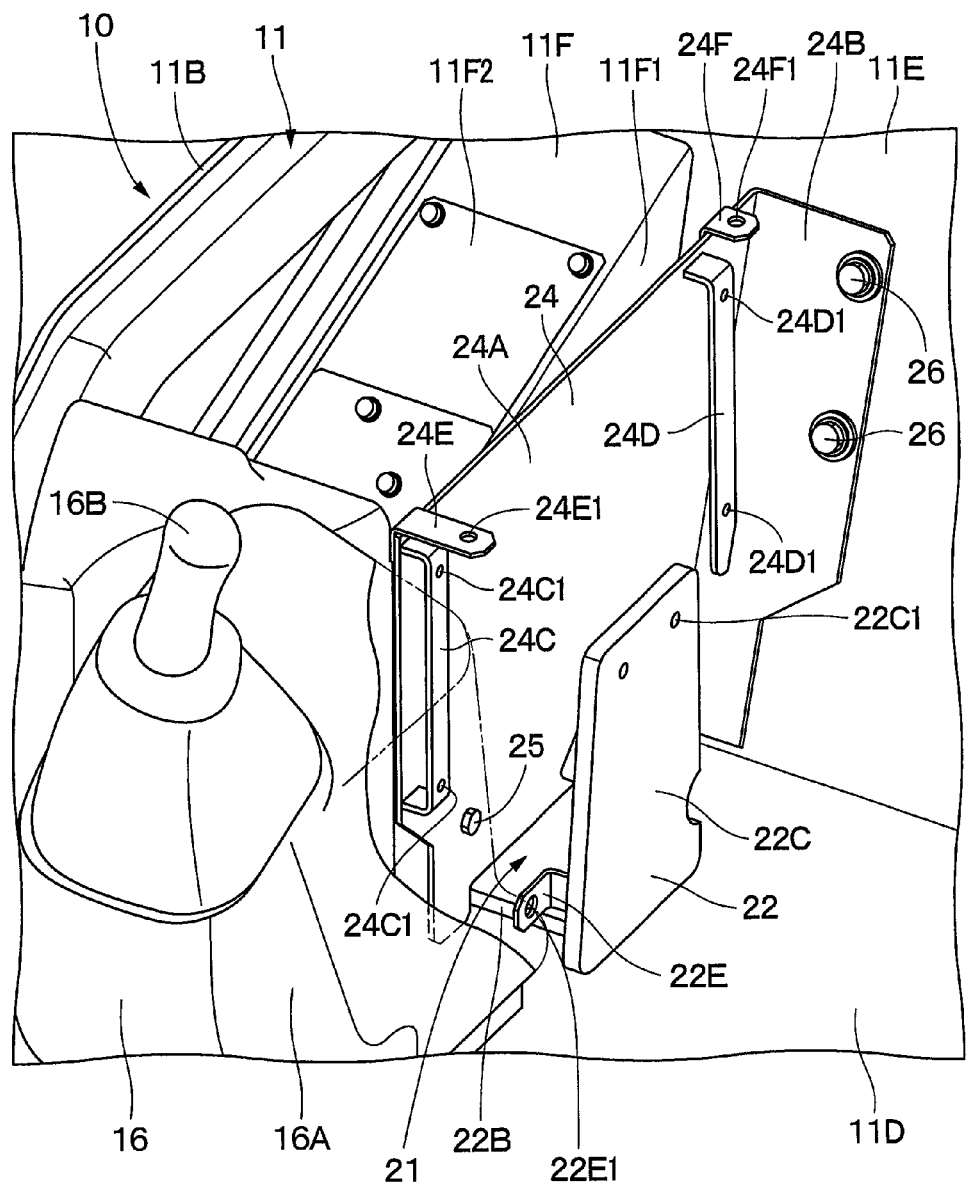
FIG. 13 is a partially enlarged perspective view of partial cutaway showing a state of mounting the bracket member and the controller fixing member to the floor member as viewed from a position similar to that in FIG. 5.

Herein, the flat plate 24A and the inclined plate 24B covers the controller 27 to be described later in cooperation with the cover member 31 to be described later, and act also as covers for covering the right side and the rear side of the controller 27. As shown in FIG. 10, two bolt through holes 24A1 are formed in a lower position of the flat plate 24A in positions in accordance with the screw holes 22D1 of the fixing member mounting frame 22D of the bracket member 22. As shown in FIG. 11, the inclined plate 24B is provided with two bolt through holes 24B1 in positions in accordance with the screw holes 11E1 of the back plate 11E in the operator's seat mounting section 11. As shown in FIG. 13, the controller mounting frame 24C is provided with two screw holes 24C1 in positions away from each other in the upper-lower direction for mounting the controller 27. Similarly, the controller mounting frame 24D is provided with two screw holes 24D1 in positions away from each other in the upper-lower direction for mounting the controller 27. Further, the cover upper part mounting projections 24E and 24F respectively are provided with screw holes 24E1 and 24F1 for mounting the cover member 31.

The controller fixing member 24 as constituted in this manner causes the flat plate 24A to be in contact with the fixing member mounting frame 22D to oppose the fixing side vertical plate 22A of the bracket member 22, and the respective bolts 25 that are inserted into the respective bolt through holes 24A1 are screwed into the screw holes 22D1 of the fixing member mounting frame 22D. Consequently, the controller fixing member 24 can be mounted to the bracket member 22. Further, the controller fixing member 24 causes the inclined plate 24B to be in contact with the back plate 11E of the operator's seat mounting section 11, and the respective bolts 26 that are inserted into the respective bolt through holes 24B1 are screwed into the screw holes 11E1 of the back plate 11E, thereby making it possible to mount the inclined plate 24B on the back plate 11E.

Designated at 27 is the controller (see FIG. 14) that is disposed in the controller accommodating space 21. This controller 27 is connected to a control device of an engine 6, and electrical components (not shown) such as various kinds of sensors and switches, and controls them in response to an operation of an operator. The controller 27 is constituted to cover a microcomputer (not shown) composed of many electrical components with a boxy case 28, and a harness 29 that is formed by bundling plural wires extends from a lower part of the case 28. A front surface portion 28A and a rear surface portion 28B of the case 28 are provided with mounting projections 28C (only three pieces are shown) in accordance with the screw holes 24C1 and 24D1 of the respective controller mounting frames 24C and 24D constituting part of the controller fixing member 24.

The case 28 is formed in a flat rectangular parallelopiped shape (boxy shape), and is arranged to oppose the flat plate 24A of the controller fixing member 24 so as this case 28 to be installed upright. In this vertical (rising up) arrangement state, the respective blots 30 that are inserted into the respective mounting projections 28C are screwed into the screw holes 24C1 and 24D1 of the respective controller mounting frames 24C and 24D respectively, thus making it possible to mount the controller 27 to the controller fixing member 24.

In this case, since the controller 27 is set in the vertical arrangement state, even in a case where the controller accommodating space 21 has a slight installation area in a plan view, the controller 27 can be accommodated in the controller accommodating space 21. In addition, since the controller 27 is arranged in a position higher than the seat plate 11D of the operator's seat mounting section 11 and the lower lateral plate 22B of the bracket member 22, it is possible to prevent the controller 27 from being immersed in rainwater remaining on the seat plate 11D. Further, since the controller 27 is arranged in a high position, the harness 29 can be removed from the lower side of the case 28, and the harness 29 can be easily turned around.

The cover member 31 is disposed in the controller accommodating space 21 (see, FIG. 15), and the cover member 31 covers the controller 27 together with the controller fixing member 24. The cover member 31 is formed in a frame shape by a front surface portion 31A, a left surface portion 31B and a top surface portion 31C. Herein, the cover member 31, for forming a boxy shape together with the flat plate 24A and the inclined plate 24B of the controller fixing member 24, has dimensions of the respective surface portions set corresponding thereto.

The cover member 31 is arranged to oppose the controller fixing member 24 in such a manner as to cover the controller 27. In this state, the respective bolts 32 that are inserted into the respective bolt through holes 22E1 of the cover member mounting projections 22E are screwed into respective screw holes 31B1 of the left surface portion 31B. Further, respective bolts 32 that are inserted into respective bolt through holes 31C1 of the top surface portion 31C are screwed into the screw holes 24E1 and 24F1 of the respective cover upper part mounting projections 24E and 24F of the controller fixing member 24. Therefore, the cover member 31 can cover the controller 27 together with the controller fixing member 24 to protect the controller 27 from earth and sand, dust, rainwater, impact and the like.

In this manner, after thus mounting the cover member 31, as shown in FIG. 5, the support plate 18A of the right arm rest 18 is made to be in contact with the upper side of the arm rest mounting vertical plate 22C of the bracket member 22, and in this state, the respective bolts 33 are screwed into the respective screw holes 22C1 of the arm rest mounting vertical plate 22C. Consequently, the right arm rest 18 can be mounted to the rear to side of the right operating lever assembly 16 while keeping away from the controller 27 (cover member 31).

Next, an explanation will be made of the work procedure at the time of mounting the controller 27 to the controller accommodating space 21 with reference to FIG. 12 to FIG. 15.

Figure 12:
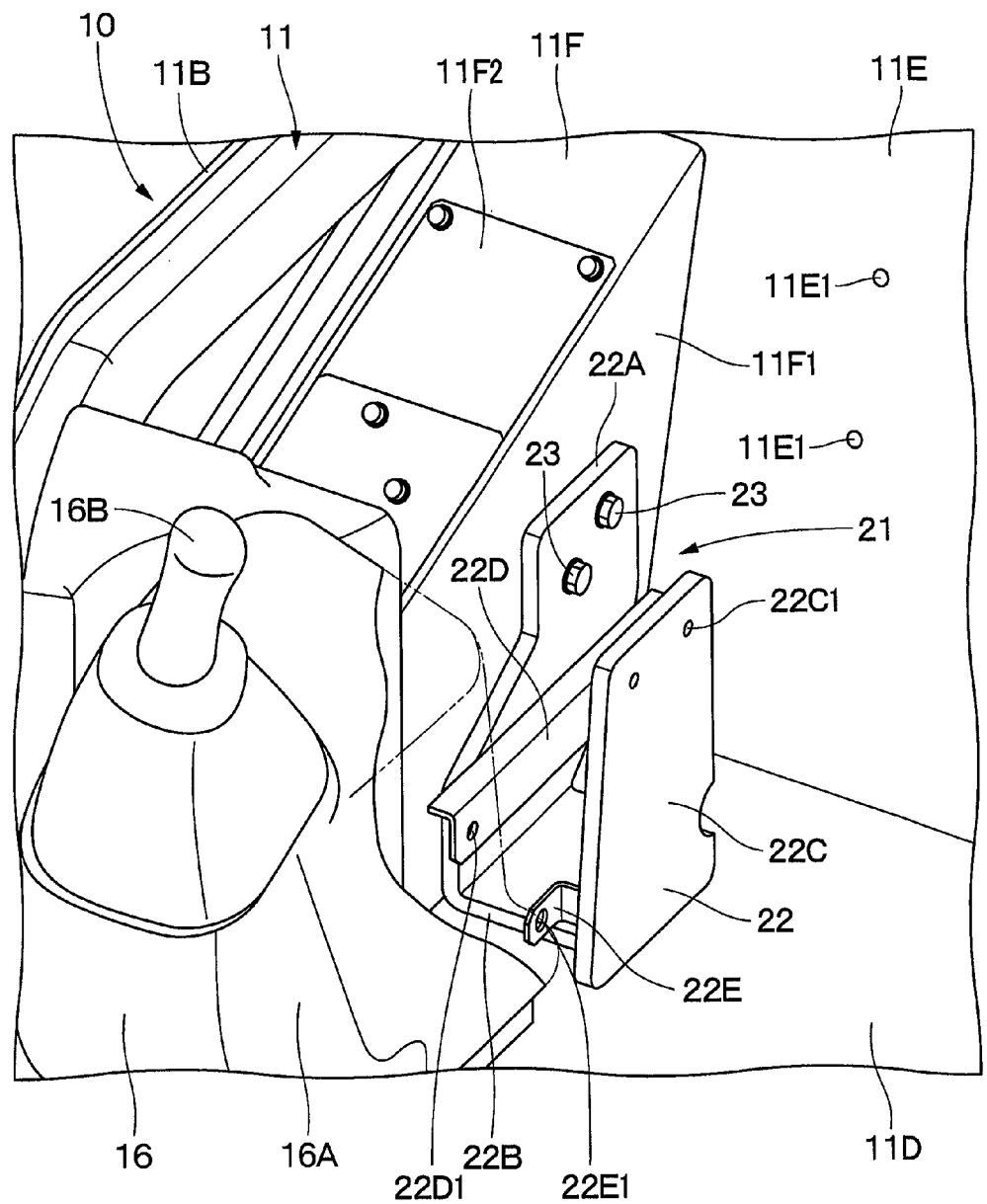
FIG. 12 is a partially enlarged perspective view of partial cutaway showing a state of mounting the bracket member to the floor member as viewed from a position similar to that in FIG. 5.

First, description will be made of a case of mounting the bracket member 22 to the equipment mounting part 11F of the operator's seat mounting section 11. In this case, the arm rest mounting vertical plate 22C of the bracket member 22 is placed on the seat plate 11D of the operator's seat mounting section 11 to make the fixing side vertical plate 22A in contact with the side surface 11F1 of the equipment mounting part 11F. In this state, the bolts 23 are inserted into the respective bolt through holes 22A1 of the fixing side vertical plate 22A, and the respective bolts 23 are screwed into the screw holes 11F3 of the side surface 11F1. Therefore, as shown in FIG. 12, the bracket member 22 can be mounted to the side surface 11F1 of the equipment mounting part 11F.

Next, description will be made of a case of mounting the controller fixing member 24 to the back plate 11E of the operator's seat mounting section 11 and the fixing side vertical plate 22A of the bracket member 22. The flat plate 24A of the controller fixing member 24 is arranged between the fixing side vertical plate 22A and the arm rest mounting vertical plate 22C of the bracket member 22, the inclined plate 24B of the controller fixing member 24 is made to be in contact with the back plate 11E, and the flat plate 24A is made to be in contact with the fixing side vertical plate 22A.

In this state, the bolts 26 are inserted into the respective bolt through holes 24B1 of the inclined plate 24B to screw the respective bolts 26 into the screw holes 11E1 of the back plate 11E. On the other hand, the bolts 25 are inserted into the respective bolt through holes 24A1 of the flat plate 24A, and the respective bolts 25 are screwed into the screw holes 22D1 of the fixing member mounting frame 22D. Consequently, as shown in FIG. 13, the controller fixing member 24 can be mounted to the back plate 11E of the operator's seat mounting section 11 and the fixing side vertical plate 22A of the bracket member 22.

Figure 14:
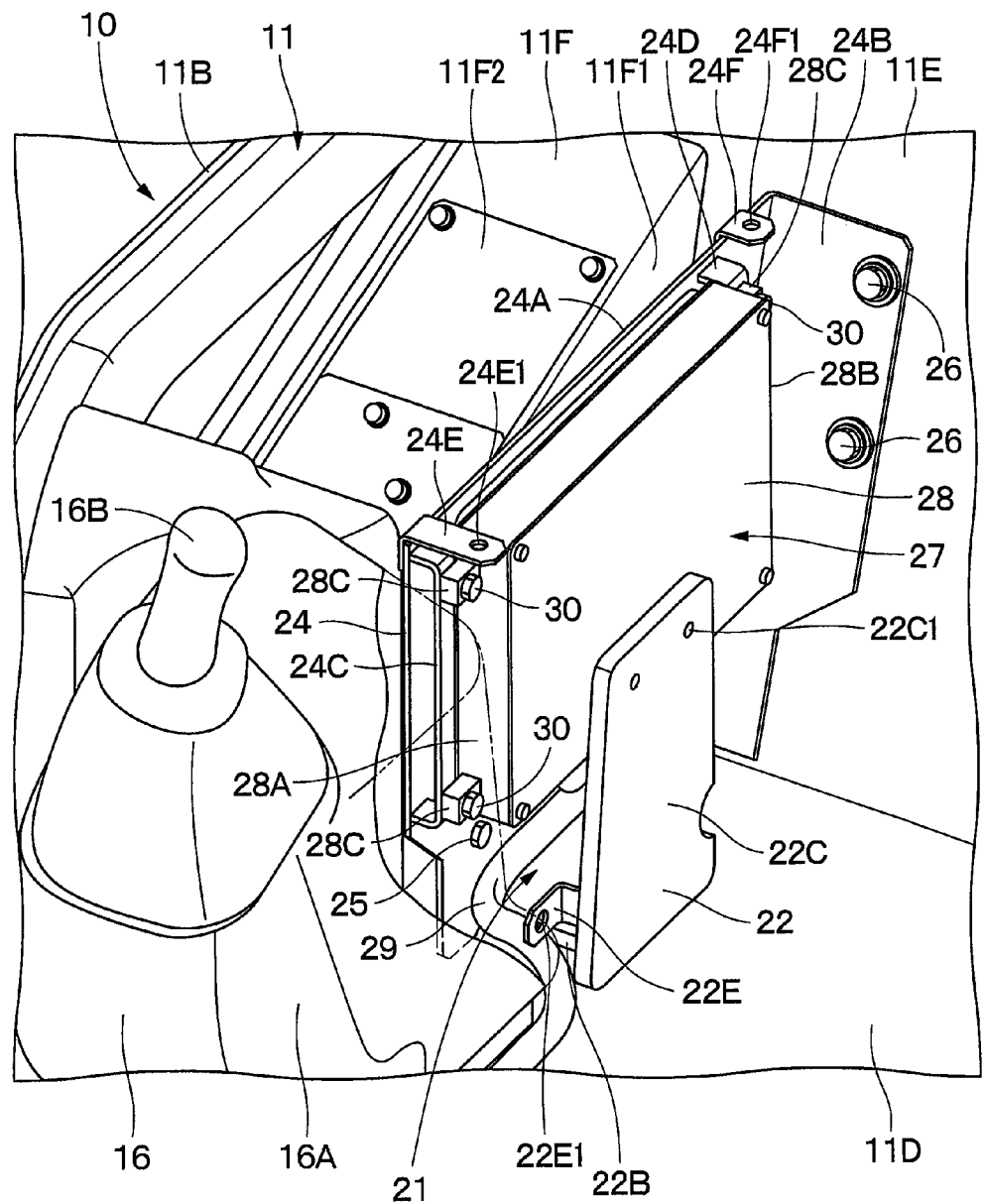
FIG. 14 is a partially enlarged perspective view of partial cutaway showing a state of mounting the bracket member, the controller fixing member and the controller to the floor member as viewed from a position similar to that in FIG. 5.

On the other hand, in a case of mounting the controller 27 to the controller fixing member 24, the case 28 of the controller 27 is arranged to oppose the flat plate 24A of the controller fixing member 24. In this state, the bolts 30 that are inserted into the respective mounting projections 28C provided in the case 28 are screwed into the screw holes 24C1 of the controller mounting frame 24C in the controller fixing member 24 and the screw holes 24D1 of the controller mounting frame 24D respectively. Consequently, as shown in FIG. 14, the controller 27 can be positioned in the controller accommodating space 21 to be mounted to the controller fixing member 24.

Figure 15:
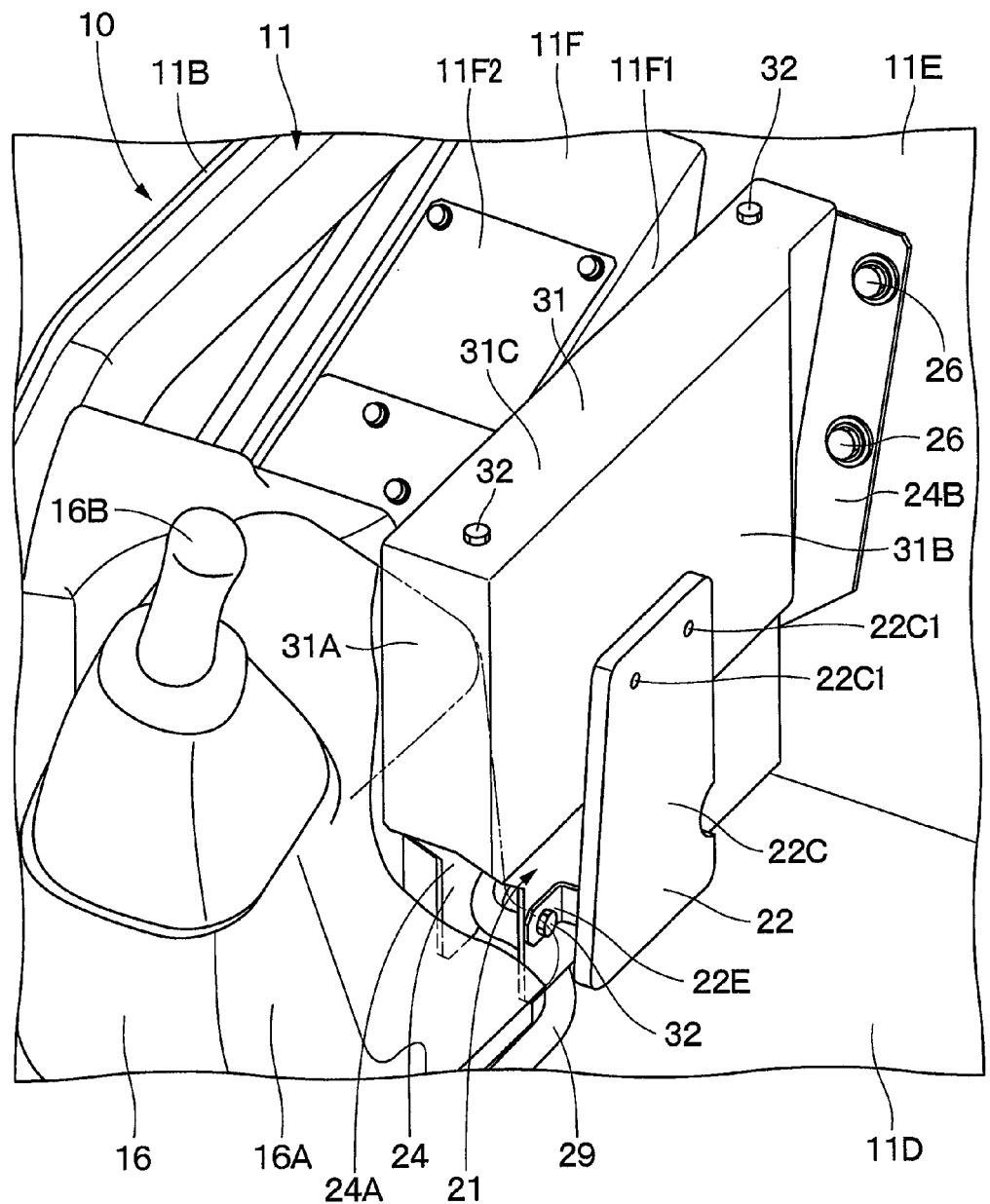
FIG. 15 is a partially enlarged perspective view of partial cutaway showing a state of mounting the bracket member, the controller fixing member, the controller and the cover member to the floor member as viewed from a position similar to that in FIG. 5.

Further, in a case of mounting the cover member 31 to the bracket member 22 and the controller fixing member 24, a left surface portion 31B is inserted between the arm rest mounting vertical plate 22C and the controller 27, and the cover member 31 is arranged to cover the controller 27. In this state, the respective bolts 32 that are inserted into the respective bolt through holes 22E1 of the respective cover member mounting projections 22E are screwed into the respective screw holes 31B1 of the left surface portion 31B. On the other hand, the bolts 32 that are inserted into the respective bolt through holes 31C1 of the top surface portion 31C are respectively screwed into the screw hole 24E1 of the cover upper part mounting projection 24E and the screw hole 24F1 of the cover upper part mounting projection 24F, which are disposed on the controller fixing member 24. Consequently, as shown in FIG. 15, the cover member 31 can be mounted to the bracket member 22 and the controller fixing member 24.

The hydraulic excavator 1 according to the present embodiment has the constitution as described above, and next, an operation thereof will be explained.

An operator who boards on the floor member 10 in the cab box 20 and sits on the operator's seat 14 operates the operating lever/pedal 19 for traveling, thus traveling the lower traveling structure 2. On the other hand, by operating the lever portion 15B or 16B of the left or right operating lever assembly 15 or 16, the working mechanism 4 and the like can be operated to perform an excavating operation of earth and sand, and the like.

In consequence, according to the present embodiment, the controller accommodating space 21 is disposed in back side of the right operating lever assembly 16 between the side surface 11F1 of the equipment mounting part 11F in the operator's seat mounting section 11 and the operator's seat 14, the controller 27 that controls various kinds of electric equipment is mounted in the controller accommodating space 21.

Accordingly, as in the case of the small-sized hydraulic ho excavator 1 called a mini-excavator, even in a case where the upper revolving structure 3 is sized to be small, thereby the respective equipment, the components, the controller 27 and the like are narrowly arranged, and therefore the installation space in the upper revolving structure 3 is limited, the controller 27 can be mounted in the controller accommodating space 21 by using the controller accommodating space 21 provided between the side surface 11F1 of the equipment mounting part 11F and the operator's seat 14 in back side of the right operating lever assembly 16. The position where the controller 27 is mounted is a position within easy reach in a state where an operator gets on the foot rest section 12 of the floor member 10.

As a result, the controller 27 can be mounted also to the upper revolving structure 3 of the small-sized hydraulic excavator 1. In addition, since the controller 27 is set in a vertical arrangement state, the controller 27 can be accommodated in the controller accommodating space 21 that is a small vacant space lateral to the operator's seat 14. In this case, since the position lateral to the operator's seat 14 is a position within easy reach, a removal work, an inspection work, a repair work and the like of the controller 27 can be easily performed.

On the other hand, the controller 27 is mounted to the side surface 11F1 of the equipment mounting part 11F through the bracket member 22 and the controller fixing member 24. Therefore, the controller 27 can be mounted by using the side surface 11F1 of the equipment mounting part 11F. In this case, the controller 27 can be mounted to a high position away above from the seat plate 11D. In consequence, even if rainwater remains on the seat plate 11D, it is possible to prevent the rainwater from entering into the case 28 of the controller 27. Thereby, the case 28 of the controller 27 can be formed as an inexpensive case that is low in water proof properties.

Since the U-shaped space, which is formed by the fixing side vertical plate 22A, the lower lateral plate 22B and the arm rest mounting vertical plate 22C of the bracket member 22, is used as a part of the controller accommodating space 21, the controller 27 can be accommodated in the controller accommodating space 21. In addition, the right arm rest 18 can be mounted to the arm rest mounting vertical plate 22C while keeping away from the controller 27.

The controller fixing member 24 comprises the flat plate 24A along the side surface 11F1 of the equipment mounting part 11F, the controller mounting frames 24C and 24D disposed in the front and rear positions of the flat plate 24A, and the like. The controller 27 is provided with the mounting projections 28C in the front and rear positions of the case 28. Thereby, the bolts 30 that are inserted into the mounting projections 28C disposed in the case 28 of the controller 27 are screwed into the screw holes 24C1 and 24D1 of the controller mounting frames 24C and 24D of the controller fixing member 24, and therefore the controller 27 can be mounted integrally with the controller fixing member 24.

Further, the cover member 31 is provided in the controller fixing member 24 for covering the controller 27 between the cover member 31 and the controller fixing member 24. Consequently, the cover member 31 can protect the controller 27 from earth and sand, dust, rainwater, impact and the like.

It should be noted that the present embodiment is explained by taking a case where the controller 27 is mounted to the fixing side vertical plate 22A of the bracket member 22 through the controller fixing member 24, as an example. However, the present invention may be constituted to mount the controller 27, for example, directly to the fixing side vertical plate 22A of the bracket member 22 without use of this controller fixing member 24. Further, the present invention may be constituted to mount the controller 27 directly to the side surface 11F1 of the equipment mounting part 11F without use of the bracket member 22.

The present embodiment is explained by taking a case where the floor member 10 can tilt up/down to the revolving frame 5 by using the front side position as a fulcrum. However, the present invention is not limited thereto, and can be applied, for example, to a hydraulic excavator of a type where the floor member is provided to be fixed to the revolving frame.

In addition, the present embodiment is explained by taking the hydraulic excavator 1 of the crawler type equipped with the cab box 20 for covering the periphery of and the section above the operator's seat 14 as an example of the construction machine. However, the present invention is not limited thereto, and may be applied to a hydraulic excavator of a crawler type equipped with a canopy for covering the section above the operator's seat 14, for example. On the other hand, the present invention may be applied to a hydraulic excavator equipped with a wheel type lower traveling structure instead of the crawler type hydraulic excavator 1. Further, the present invention may be applied to the other construction machine such as a hydraulic crane.

DESCRIPTION OF REFERENCE NUMERALS

1: Hydraulic excavator (Construction machine)
2: Lower traveling structure
3: Upper revolving structure
4: Working mechanism
5: Revolving frame
10: Floor member
11: Operator's seat mounting section
11D: Seat plate
11F: Equipment mounting part
11F1: Side surface
12: Foot rest section
14: Operator's seat
15: Left operating lever assembly
16: Right operating lever assembly
17: Left arm rest
18: Right arm rest
21: Controller accommodating space
22: Bracket member
22A: Fixing side vertical plate
22B: Lower lateral plate
22C: Arm rest mounting vertical plate
24: Controller fixing member
24A: Flat plate
24C, 24D: Controller mounting frame
27: Controller
28: Case
28C: Mounting projection
30: Bolt
31: Cover member

The invention claimed is:

1. A construction machine comprising:
an automotive lower traveling structure (2);
an upper revolving structure (3) that is mounted on said lower traveling structure (2) to be able to revolve thereon; and
a working mechanism (4) that is tiltably mounted to said upper revolving structure (3), wherein
said upper revolving structure (3) includes:
a revolving frame (5) that forms a support structure; and
a floor member (10) that is provided on said revolving frame (5) and constitutes an operator's seat mounting section (11) at the rear side and a foot rest section (12) at the front side on which an operator rests his or her feet,
said operator's seat mounting section (11) of said floor member (10) includes a seat plate (11D) for mounting an operator's seat (14) on which an operator is seated and an equipment mounting part (11F) that rises upward from one side of said seat plate (11D) in the right-left direction, and
an operating lever assembly (16) that is operated by the operator seated on said operator's seat (14) is provided in front of said equipment mounting part (11F), characterized in that:
a controller accommodating space (21) is provided in back side of said operating lever assembly (16) and between a side surface (11F1) of said equipment mounting part (11F) and said operator's seat (14),
a controller (27) is mounted in said controller accommodating space (21) to control various kinds of electric equipment,
a bracket member (22) is provided in back side of said operating lever assembly (16) and to said side surface (11F1) of said equipment mounting part (11F) for mounting said controller (27) and an arm rest (18) on which an operator's arm rests, wherein
said bracket member (22) comprises a fixing side vertical plate (22A) that extends in an upper-lower direction along said side surface (11F1) of said equipment mounting part (11F) and is mounted to said side surface (11F1), a lower lateral plate (22B) that extends inside toward said operator's seat (14) from a lower part of said fixing side vertical plate (22A) and an arm rest mounting vertical plate (22C) that is provided to extend in an upper direction from a tip end part of said lower lateral plate (22B) to oppose said fixing side vertical plate (22A) with an interval and to which said arm rest (18) is mounted, and
a part of said controller accommodating space (21) is a U-shaped space in a transverse section, which is formed with said fixing side vertical plate (22A), said lower lateral plate (22B) and said arm rest mounting vertical plate (22C) that constitute said bracket member (22).

2. The construction machine according to claim 1, wherein,
a controller fixing member (24) is provided to said fixing side vertical plate (22A) of said bracket member (22) for fixing said controller (27), wherein
said controller (27) is fixed in a vertical arrangement state of extending in an upper-lower direction and in a front-rear direction to said controller fixing member (24).

3. The construction machine according to claim 2, wherein,
said controller fixing member (24) comprises a flat plate (24A) that extends in a front-rear direction along said side surface (11F1) of said equipment mounting part (11F) and a pair of controller mounting frames (24C, 24D) that are provided respectively in a front side position and in a rear side position of said flat plate (24A), wherein
said controller (27) is provided with mounting projections (28C) in a front side position and in a rear side position of a case (28) for accommodating an electric component, and
said controller (27) is constituted such that each of said mounting projections (28C) is fixed to each of said controller mounting frames (24C, 24D) by using bolts (30).

4. The construction machine according to claim 2, wherein, a cover member (31) for covering said controller (27) is provided, and said cover member (31) is supported by said bracket member (22) and/or said controller fixing member (24).

* * * * *